United States Patent
Shimizu et al.

(10) Patent No.: US 9,250,724 B2
(45) Date of Patent: Feb. 2, 2016

(54) INFORMATION MANAGEMENT SYSTEM

(71) Applicant: NITTO DENKO CORPORATION, Ibaraki-shi, Osaka (JP)

(72) Inventors: Yusuke Shimizu, Ibaraki (JP); Ryoma Yoshioka, Ibaraki (JP)

(73) Assignee: NITTO DENKO CORPORATION, Ibaraki-shi (JP)

(*) Notice: Subject to any disclaimer, the term of this patent is extended or adjusted under 35 U.S.C. 154(b) by 40 days.

(21) Appl. No.: 14/361,933

(22) PCT Filed: Jan. 21, 2014

(86) PCT No.: PCT/JP2014/051028
§ 371 (c)(1),
(2) Date: May 30, 2014

(87) PCT Pub. No.: WO2014/136483
PCT Pub. Date: Sep. 12, 2014

(65) Prior Publication Data
US 2015/0338935 A1 Nov. 26, 2015

(30) Foreign Application Priority Data

Mar. 8, 2013 (JP) ................................. 2013-046610
Apr. 19, 2013 (JP) ................................. 2013-087942

(51) Int. Cl.
*G06F 3/042* (2006.01)
*G06F 3/0354* (2013.01)
*G06F 3/03* (2006.01)

(52) U.S. Cl.
CPC .......... *G06F 3/03545* (2013.01); *G06F 3/0304* (2013.01)

(58) Field of Classification Search
None
See application file for complete search history.

(56) References Cited

U.S. PATENT DOCUMENTS

| 6,396,598 | B1 | 5/2002 | Kashiwagi et al. |
| 2004/0164972 | A1 | 8/2004 | Carl |
| 2008/0019616 | A1 | 1/2008 | Hotta et al. |

(Continued)

FOREIGN PATENT DOCUMENTS

| CN | 1614534 A | 5/2005 |
| CN | 1734470 A | 2/2006 |

(Continued)

OTHER PUBLICATIONS

International Search Report dated Mar. 4, 2014 issued in Application No. PCT/JP2014/051026. (3 pages).
International Search Report dated Mar. 4, 2014, issued in Application No. PCT/JP2014/51027. (5 pages).
Translation of Written Opinion dated Mar. 4, 2014, issued in Application No. PCT/JP2014/051026 (4 pages).
English Translation of Written Opinion dated Mar. 4, 2014, issued in Application No. PCT/JP2014/051027 (4 pages).

(Continued)

*Primary Examiner* — Adam R Giesy
(74) *Attorney, Agent, or Firm* — Westerman, Hattori, Daniels & Adrian, LLP (57) ABSTRACT

Provided is an information management system, esigned not to sense a hand holding a writing tool at the time of writing on a sheet. The information management system is provided with a personal computer which has a display, and an electronic underlay which is laid under a sheet to perform writing. The electronic underlay is provided with: a sheet-like optical waveguide formed by sandwiching lattice-like cores between a sheet-like under cladding layer and a sheet-like over cladding layer; a light emitting element connected to one end surface of the cores; and a light receiving element connected to another end surface of the core. An elasticity modulus of the core is larger than an elasticity modulus of the under cladding layer and of the over cladding layer.

4 Claims, 3 Drawing Sheets

(56) References Cited

U.S. PATENT DOCUMENTS

| | | |
|---|---|---|
| 2010/0156848 A1 | 6/2010 | Yatsuda et al. |
| 2010/0171717 A1 | 7/2010 | Hu et al. |
| 2011/0079501 A1 | 4/2011 | Arai |
| 2012/0327033 A1 | 12/2012 | Shimizu et al. |
| 2013/0009911 A1 | 1/2013 | Shibata et al. |
| 2013/0015334 A1 | 1/2013 | Chen et al. |

FOREIGN PATENT DOCUMENTS

| | | | |
|---|---|---|---|
| CN | 1752994 | A | 3/2006 |
| CN | 1774690 | A | 5/2006 |
| CN | 1855010 | A | 11/2006 |
| CN | 102034765 | A | 4/2011 |
| CN | 102411433 | A | 4/2012 |
| CN | 102411458 | A | 4/2012 |
| CN | 102722284 | A | 10/2012 |
| CN | 102812503 | A | 12/2012 |
| CN | 102831391 | A | 12/2012 |
| CN | 102890565 | A | 1/2013 |
| JP | 61-188515 | A | 8/1986 |
| JP | 1-172916 | A | 7/1989 |
| JP | 2-115919 | A | 4/1990 |
| JP | 10-91348 | A | 4/1998 |
| JP | 2002-344641 | A | 11/2002 |
| JP | 2005-107804 | A | 4/2005 |
| JP | 3746378 | B2 | 2/2006 |
| JP | 2006-301979 | A | 11/2006 |
| JP | 2007-34907 | A | 2/2007 |
| JP | 2010-151992 | A | 7/2010 |
| JP | 2012-198301 | A | 10/2012 |
| JP | 2013-8138 | A | 1/2013 |
| WO | 2014/136471 | A1 | 9/2014 |
| WO | 2014/136472 | A1 | 9/2014 |
| WO | 2014/136508 | A1 | 9/2014 |

OTHER PUBLICATIONS

Search Report dated Feb. 25, 2015, issued in Chinese Patent Application No. 201480000284.2, with English translation (4 pages).
English Translation of Written Opinion dated Mar. 4, 2014, issued in corresponding Patent Application No. PCT/JP2014/051028 (4 pages).
Non-Final Office Action dated Jul. 10, 2015, issued in U.S. Appl. No. 14/362,060 (20 pages).
International Search Report dated Mar. 4, 2014 issued in corresponding application No. PCT/JP2014/051028.
US Office Action dated Dec. 9, 2014, issued in corresponding U.S. Appl. No. 14/361,996 (16 pages).
Search Report dated Jun. 25, 2015, issued in counterpart Chinese Application No. 2014800002838, w/English translation (4 pages).
Notification of Transmittal of Translation of the International Preliminary Report on Patentability (Form PCT/IB/338) issued in counterpart International Patent Application No. PCT/JP2014/051028 mailed Sep. 17, 2015 with Forms PCT/IB/373 and PCT/ISA/237 (6 pages).
Supplemental European Search Report dated Oct. 27, 2015, issued in European Patent Application No. 1427698.4 (10 pages).
Supplementary European Search Report dated Oct. 27, 2015, issued in European Patent Application No. 14727699.2 (8 pages).
Supplementary European Search Report dated Oct. 27, 2015, issued in European Patent Application No. 14727700.8 (9 pages).
Wouters, et al., "Determining the Young's modulus and creep effects in three different photo definable epoxies for MEMS applications", Sensors and Actuators A: Physical, 2009, pp. 196-200.
Notification of Transmittal of Translation of the International Preliminary Report on Patentability (Form PCT/IB/338) issued in counterpart International Application No. PCT/JP2014/051026 mailed Sep. 17, 2015, with Forms PCT/IB/1373 and PCT/ISA/237 (7 pages).
Notification of Transmittal of Translation of the International Preliminary Report on Patentability (Form PCT/IB/338) issued in counterpart International Application No. PCT/JP2014/051027 mailed Sep. 17, 2015, with Forms PCT/IB/373 and PCT/ISA/237 (6 pages).

INFORMATION MANAGEMENT SYSTEM

TECHNICAL FIELD

The present invention relates to an information management system, which can be laid under a sheet where letters or the like are to be handwritten, to control the contents entered in the sheet as digital data (electronic data).

BACKGROUND ART

For example, in the case of applying for a sports club membership, generally a membership applicant enters required items such as an address and a name in an application sheet dedicated to the sports club. Then, a staff of the sports club inputs information such as the address entered in the application sheet into a personal computer, using a keyboard, for management of new members (e.g., see PL 1).

CITATION LIST

Patent Literature

PL1: JP-A-2007-034907

SUMMARY OF THE INVENTION

However, when the staff is to make input after the membership applicant has made an entry in the application sheet, not only the time but also labor of the staff is required. Further, during the input into the personal computer, a keyboard operation error may cause an input error. Moreover, it is costly for the sports club to manage the application sheet.

The present applicant has proposed and already filed a notebook device in which letters or the like entered in a sheet can be directly digitized (JP-A-2012-160160). The notebook device is provided with an optical waveguide in a square frame shape, and allows light to travel in a lattice shape within the square frame. When the optical waveguide in the square frame shape is put on a bound sheet in a type of a notebook in which a writing is to be performed with a writing tool and letters or the like are written with the writing tool in a portion of the sheet exposed from the inside of the square frame, a pen tip shades the light traveling in the lattice shape and a position of the pen tip is detected from the light shaded position, thereby to allow the entered letters or the like to be specified as electronic data. That is, the notebook device is to allow the letters or the like entered in the sheet to be formed directly into electronic data.

However, in the notebook device, in some cases, when a little finger, its root portion (hypothenar), or the like of a hand holding the writing tool such as the pen comes into the square frame, that portion of the hand may also shade the lattice-like light and may thus be judged as entered letters or the like and formed into electronic data. The electronic data of the portion of the hand is unnecessary.

The present invention was made in view of such circumstances, and has an object to provide an information management system, which is not one using light-shading as described above, but one using a change in light propagation of a core based on writing pressure that is applied to an optical waveguide by a writing tool such as a pen. For this reason, the information management system is not one used by being put on a sheet as described above, but one used by being laid under the sheet, and designed not to sense an unnecessary portion such as a little finger, its root portion or the like of a hand holding the writing tool at the time of writing on the sheet with the writing tool. The information management system is capable of writing on the sheet and simultaneously forming the entered contents into electronic data to manage the electronic data.

In order to achieve the above object, an information management system of the present invention comprises: a personal computer which has a display; and an electronic underlay (A) described below which is used by being laid under a sheet to perform a writing in with a writing tool, and configured such that the electronic underlay specifies a movement locus of a tip of a writing tool on the surface of the sheet, outputs it to the personal computer and displays it on the display.

(A) The electronic underlay comprises a sheet-like optical waveguide in which a plurality of linear cores are arranged and formed in a lattice shape on the surface of a sheet-like under cladding layer, an over cladding layer is formed in a sheet shape in the state of covering the cores, and the surface of the over cladding layer is made a contact surface with the sheet; a light emitting element connected to one end surface of each of the cores; a light receiving element connected to the other end surface of each of the cores; and movement locus specifying means for specifying a movement locus of a tip of a writing tool on a surface of the optical waveguide by use of a light propagation amount of the cores, the light propagation amount being changed due to the movement. An elasticity modulus of the core is larger than an elasticity modulus of the under cladding layer and an elasticity modulus of the over cladding layer, and in a state where the surface of the sheet-like optical waveguide is pressed by the tip of the writing tool, in a direction of the pressing, a deformation ratio of the core in a cross section is smaller than deformation ratios of the over cladding layer and the under cladding layer in cross sections.

It is to be noted that in the present invention, the "deformation ratio" refers to a ratio of an amount of change in a pressing direction in each of thicknesses of the core, the over cladding layer and the under cladding layer at the time of pressing with respect to each of those before pressing. Further, "movement" of the tip of the writing tool includes the case of a movement distance being 0 (zero), and a "movement locus" in that case is a point.

The information management system of the present invention is provided with an electronic underlay which is used by being laid under a sheet to perform a writing in with a writing tool. The electronic underlay is provided with a sheet-like optical waveguide in which an elasticity modulus of a core is larger than an elasticity modulus of an under cladding layer and an elasticity modulus of an over cladding layer. Accordingly, when the surface of the over cladding layer in the optical waveguide is pressed, in a direction of the pressing, a deformation ratio of the core in a cross section is smaller than deformation ratios of the over cladding layer and the under cladding layer in cross sections, and a cross sectional area of the core is retained in the pressing direction. When a sheet is put on the surface of the over cladding layer in the optical waveguide and letters or the like are entered in the sheet with a writing tool such as a pen, writing pressure by a tip (pen tip, or the like) and pressure by a portion of a hand holding the writing tool are transmitted to the over cladding layer via the sheet, and the surface of the over cladding layer is pressed. The pressing makes it possible that, at a portion pressed by the tip of the writing tool, bending of the core becomes steep along with the tip of the writing tool, and leakage (scattering) of light from the core occurs, and at a portion pressed by the portion of the hand holding the writing tool, bending of the core becomes gentle along the hand, and the leakage (scattering) of light does not occur. This then makes it possible that, as for the core pressed by the tip such as the pen tip, a light detection level (amount of received light) in a light receiving element decreases, and as for the core pressed by the portion of the hand holding the writing tool, a detection level does not decrease. A position (coordinates) of the tip such as the pen tip can be detected by movement locus specifying means due to the decrease in the light detection level. The portion of the hand whose detection level does not decrease is in the same state as a state where it is not pressed, and it can thus be prevented from being sensed. Therefore, only a movement locus of the tip such as the pen tip (information such as the letters having been entered) can be detected. Then, the movement locus of the tip such as the pen tip can be outputted as electronic data to the personal computer, to be displayed on a display of the personal computer. That is, information such as letters entered in the sheet can be formed into electronic data simultaneously with the entry, and can also be subjected to organization and the like for management, using the personal computer.

BRIEF DESCRIPTION OF THE DRAWINGS

FIG. 2 schematically shows an electronic underlay constituting the information management system, where

DESCRIPTION OF EMBODIMENTS

Next, an embodiment of the present invention will be described in detail based on the drawings.

Figure 1:
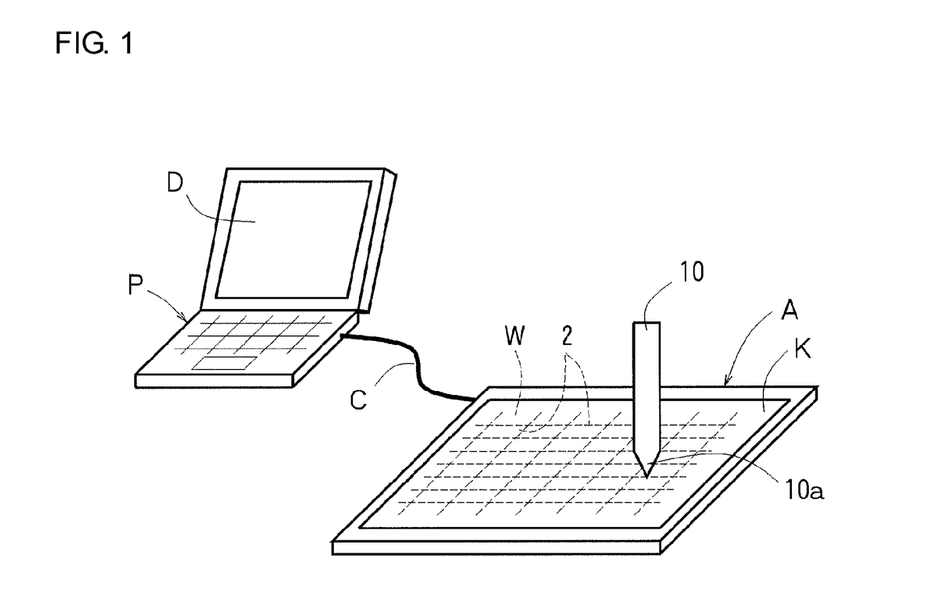
FIG. 1 is an explanatory view schematically showing one embodiment of an information management system of the present invention.

FIG. 1 shows one embodiment of an information management system of the present invention. The information management system of this embodiment is provided with a personal computer P which has a display D, and an electronic underlay A which is used by being laid under a sheet K to perform a writing with a writing tool 10 such as a pen. In this embodiment, the personal computer P is connected with the electronic underlay A through a connection cable C such as a micro USB cable, and information such as letters entered in the sheet K are detected in the electronic underlay A, outputted to the personal computer P via the connection cable C, and displayed on the display D.

Figure 2A:
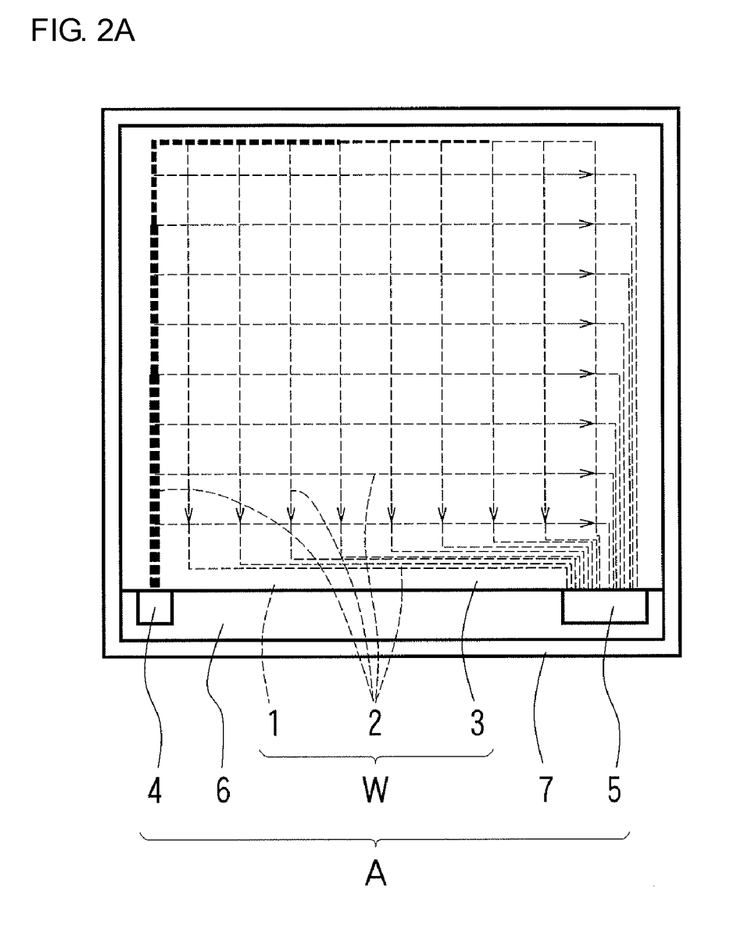
FIG. 2A is its plan view and FIG. 2B is its enlarged sectional view.
Figure 2B:
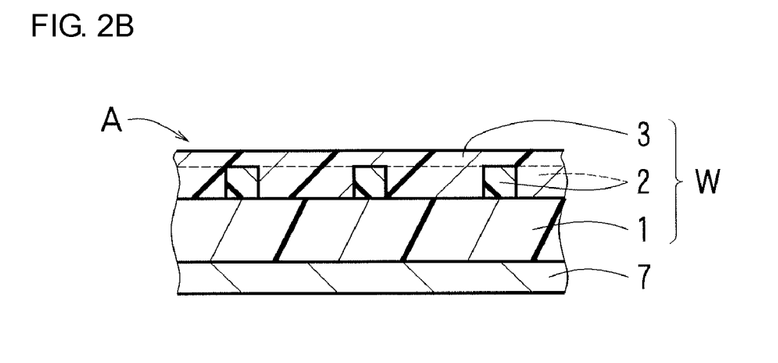

As its plan view is shown in FIG. 2A and its enlarged sectional view of its center part is shown in FIG. 2B, the electronic underlay A is provided with: a square sheet-like optical waveguide W formed by sandwiching lattice-like cores 2 between a square sheet-like under cladding layer 1 and a square sheet-like over cladding layer 3; a light emitting element 4 connected to one end surface of each of linear cores 2 constituting the lattice-like cores 2; a light receiving element 5 connected to the other end surface of the linear core 2; and a circuit board 6 mounted with a CPU (central processing unit) (not shown) for controlling the electronic underlay A, the light emitting element 4 and the light receiving element 5. In this embodiment, the optical waveguide W and the circuit board 6 are provided on the surface of a rigid plate 7 such as a resin plate or a metal plate. Then, light emitted from the light emitting element 4 passes through the core 2, and is received in the light receiving element 5. Further, in the optical waveguide W, an elasticity modulus of the core 2 is larger than an elasticity modulus of the under cladding layer 1 and an elasticity modulus of the over cladding layer 3. With this elasticity moduli, when the surface of the optical waveguide W is pressed, in the pressing direction, a deformation ratio of the core 2 in a cross section is made smaller than deformation ratios of the over cladding layer 3 and the under cladding layer 1 in cross sections.

It is to be noted that in FIG. 2A, the core 2 is indicated by a chain line, and a thickness of the core 2 is indicated by a thickness of the chain line. Further, in FIG. 2A, the cores 2 are illustrated in abbreviated number. Moreover, an arrow of FIG. 2A indicates a light travelling direction. Furthermore, in the embodiment, power required for each of the light emitting element 4, the CPU and the like is supplied from the personal computer P via the connection cable C. Then, when the electronic underlay A is to be used by being laid under the sheet K, the surface of the over cladding layer 3 [cf. FIGS. 3A and 3B] in the optical waveguide W of the electronic underlay A is the contact surface with the sheet K.

An input region on the sheet K is a portion corresponding to the lattice-like cores 2 (cf. FIG. 2A) in the optical waveguide W of the electronic underlay A. Input of information on the sheet K by use of the writing tool 10 (cf. FIG. 1) is made by moving a tip 10a (such as a pen tip) of the writing tool 10 (cf. FIG. 1) on the surface of the sheet K so as to write letters or the like on the surface of the sheet K. That is, as shown in the sectional views of FIGS. 3A and 3B, when information such as letters is inputted on the surface of the sheet K by being entered with the writing tool 10 such as a pen held in the hand 20, both in a portion pressed by the tip 10a such as the pen tip [cf. FIG. 3A] and a portion pressed by a little finger, its root portion (hypothenar) or the like of the hand 20 [cf. FIG. 3B], the over cladding layer 3 and the under cladding layer 1 having the smaller elasticity moduli are deformed so as to be crushed, and the core 2 having the larger elasticity modulus is bent so as to sink into the under cladding layer 1 along the tip 10a such as the pen tip and the portion of the hand 20, while retaining its cross sectional area.

Figure 3A:
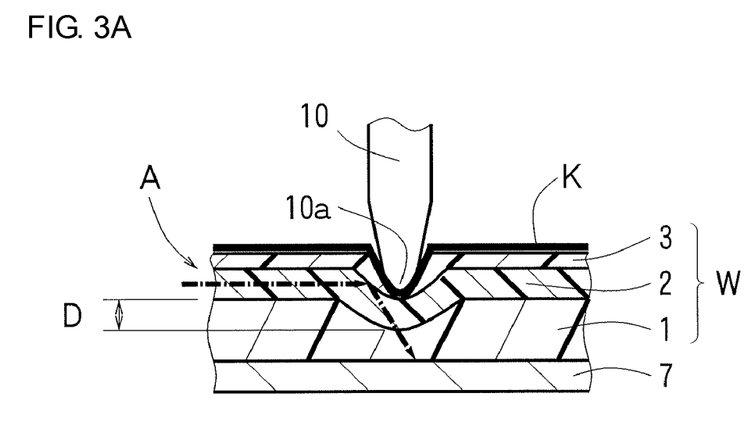
FIG. 3A is a sectional view schematically showing a state of an optical waveguide of the electronic underlay, pressed by a writing tool via a sheet.
Figure 3B:
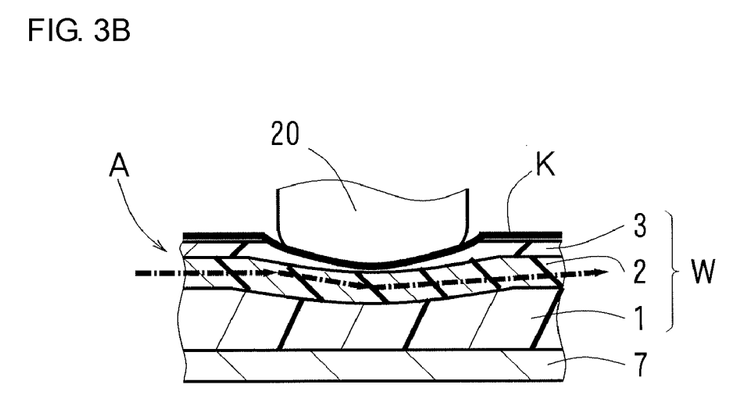
FIG. 3B is a sectional view schematically showing a state of the optical waveguide pressed by a hand via the sheet.

Then, as shown in FIG. 3A, at the portion pressed by the tip 10a, bending of the core 2 becomes steep since the tip 10a is sharp, and leakage (scattering) of light from the core 2 occurs [cf. two-dot chain line of FIG. 3A]. On the other hand, as shown in FIG. 3B, at the portion pressed by the hand 20 holding the writing tool 10, bending of the core 2 becomes gentle since the hand 20 is quite large and round as compared with the tip 10a of the writing tool 10, and leakage (scattering) of light does not occur (light travels within the core 2 without being leaked [cf. two-dot chain line of FIG. 3B]. This makes it possible that, as for the core 2 pressed by the tip 10a, a light detection level in the light receiving element 5 decreases, and as for the core 2 pressed by the hand 20 holding the writing tool 10, a detection level does not decrease. Then, due to the decrease in light detection level, a position (coordinates) of the tip 10a can be detected. The portion of the hand 20 whose detection level does not decrease is in the same state as a state where it is not pressed, and it is thus not sensed.

Thereat, the CPU of the electronic underlay A is incorporated with a program (movement locus specifying means) for specifying a movement locus of the tip 10a such as the pen tip from the decrease in light detection level in the light receiving element 5. That is, the electronic underlay A serves as a positional sensor for detecting the position of the tip (pen tip, etc.) 10a of the writing tool (pen, etc.) 10 that is used for inputting information. Then, data showing the movement locus of the tip 10a of the writing tool 10 is outputted to the personal computer P via the connection cable C and properly image-processed by the personal computer P, and the movement locus is displayed on the display D.

As thus described, in the information management system, when information such as letters is entered in the sheet K by use of the electronic underlay A, simultaneously therewith, the information such as the letters is formed into electronic data and outputted to the personal computer P. Then, using the personal computer P, the electronic data can be stored (recorded) and organized for proper management.

Moreover, since the elasticity modulus of the core 2 is larger than the elasticity modulus of the under cladding layer 1 and the elasticity modulus of the over cladding layer 3 in the optical waveguide W, even when the optical waveguide W is pressed by the hand 20 holding the writing tool 10, only the position of the tip 10a such as the pen tip can be detected and the portion of the hand 20 can be prevented from being sensed as described above.

Further, at the time of inputting letters and the like into the sheet K, the portion of the optical waveguide W which is pressed by the tip 10a of the writing tool 10 via the sheet K is deformed as described above, thereby making writing performance favorable.

In addition, when the pressing by the tip 10a of the writing tool 10 is released (when the tip 10a moves or input such as entry is completed), the under cladding layer 1, the core 2 and the over cladding layer 3 return to their original states [cf. FIG. 2B] due to their own restoring force. A sinking depth D of the core 2 into the under cladding layer 1 is preferably up to 2000 μm at the maximum. When the sinking depth D exceeds 2000 μm, the under cladding layer 1, the core 2 and the over cladding layer 3 may not return to their original states or cracking may occur in the optical waveguide W.

As one of uses of the information management system as thus described, there can, for example, be cited an operation of registering a new member in the sports club. That is, a sports club membership applicant lays the electronic underlay A under an application sheet dedicated to the sports club (corresponding to the sheet K) at the time of entering required items such as an address and a name in the application sheet. Doing this leads to entering the address and the like in the application sheet and simultaneously forming the address and the like into electronic data and outputting it to the personal computer P. This allows the staff of the sports club to provide the membership applicant with the entered application sheet for confirmation on the spot, thereby to eliminate the need for managing the application sheet. Further, without the staff operating the keyboard, simultaneously with entry of the address and the like, electronic data of the address is subjected to proper organization and the like for management by means of the personal computer P. Hence the input operation into the personal computer P by the staff is removed, and further, the keyboard operation error is prevented. Here, personal computer P means not only a general personal computer but also an apparatus such as a smart phone or a tablet terminal having a similar function to that of a personal computer.

It is to be noted that as for the application sheet, the one having been used so far can be used. It is thus possible to easily obtain such an advantage as described above by means of the information management system using the electronic underlay A. Moreover, it is preferable to provide a mark for positioning the application sheet on the surface of the electronic underlay A such that the information such as the address is sensed at a proper position of the electronic underlay A.

Other than the above use, there can, for example, be cited a use in a test marking operation, and in that case, it is possible to form a test result into electronic data and output it to the personal computer P for rapid organization and totaling. Further, there can be cited a use associated with security, and in that case, it is possible to form a signature written on the sheet K into electronic data, output it to the personal computer P, and compare it with the data pre-stored in the personal computer P for rapid authorization of the signature.

Here, a more detailed description will be given of the elasticity moduli and the like of the core 2, under cladding layer 1 and over cladding layer 3.

The elasticity modulus of the core 2 is preferably within a range of 1 GPa to 10 GPa, and more preferably within a range of 2 GPa to 5 GPa. When the elasticity modulus of the core 2 falls below 1 GPa, a cross sectional area of the core 2 may not be retained (the core 2 may collapse) caused by pressure of the tip 10a such as the pen tip due to the shape of the tip 10a, and there is a possibility that the position of the tip 10a cannot be properly detected. On the other hand, when the elasticity modulus of the core 2 exceeds 10 GPa, bending of the core 2 by pressure of the tip 10a may not become steep along the tip 10a, but may become gentle. For this reason, leakage (scattering) of light from the core 2 does not occur, causing the light detection level in the light receiving element 5 not to decrease, and hence there is a possibility that the position of the tip 10a cannot be properly detected. It is to be noted that a size of the core 2 is, for example, set to a thickness within a range of 5 to 100 μm and a width within a range of 5 to 500 μm.

The elasticity modulus of the over cladding layer 3 is preferably within a range of not lower than 0.1 MPa and lower than 10 GPa, and more preferably within a range of not lower than 1 MPa and lower than 5 GPa. When the elasticity modulus of the over cladding layer 3 falls below 0.1 MPa, the over cladding layer 3 is extremely soft and may thus be damaged by pressure of the tip 10a such as the pen tip due to the shape of the tip 10a, and the over cladding layer 3 is unable to protect the core 2. On the other hand, when the elasticity modulus of the over cladding layer 3 is not lower than 10 GPa, the over cladding layer 3 is not deformed as it collapses even by pressure of the tip 10a and the hand 20, causing the core 2 collapse, and hence there is a possibility that the position of the tip 10a cannot be properly detected. It should be noted that a thickness of the over cladding layer 3 is, for example, within a range of 1 to 200 μm.

The elasticity modulus of the under cladding layer 1 is preferably within a range of 0.1 MPa to 1 GPa, and more preferably within a range of 1 MPa to 100 MPa. When the elasticity modulus of the under cladding layer 1 falls below 0.1 MPa, the under cladding layer 1 is extremely soft and may thus not return to its original state after being pressed with the tip 10a such as the pen tip, and there is a possibility that the operation cannot be successively performed. On the other hand, when the elasticity modulus of the under cladding layer 1 exceeds 1 GPa, the under cladding layer 1 is not deformed as it collapses even by pressure of the tip 10a and the hand 20, causing the core 2 collapse, and hence there is a possibility that the position of the tip 10a cannot be properly detected. It should be noted that a thickness of the under cladding layer 1 is, for example, within a range of 20 to 2000 μm.

Examples of formation materials for the core 2, the under cladding layer 1 and the over cladding layer 3 include a photosensitive resin and a thermosetting resin, and the optical waveguide W can be produced by a manufacturing method in accordance with the formation materials. Further, a refractive index of the core 2 is larger than refractive indexes of the under cladding layer 1 and the over cladding layer 3. Each of the elasticity moduli and the refractive indexes can be adjusted, for example, by adjusting selection of the kind or a composition ratio of each formation material. It is to be noted that a rubber sheet may be used as the under cladding layer 1, and the core 2 may be formed in a lattice shape on the rubber sheet.

Further, an elastic layer such as a rubber layer may be provided on the rear surface of the under cladding layer 1 (between the under cladding layer 1 and the rigid plate 7). In this case, even when the restoring force of the under cladding layer 1, the core 2 and the over cladding layer 3 becomes weak or the under cladding layer 1 and the like are originally made of materials with weak restoring force, the weak restoring force can be supported using elastic force of the elastic layer, and their states can be returned to the original ones after pressure by the tip 10a of the writing tool 10 has been released.

Further, so that only the position of the tip 10a such as the pen tip is detected and the hand 20 holding the writing tool 10 such as the pen is not sensed, what is of importance is an amount of leakage (scattering) of light due to abrupt bending of the core 2 at a portion pressed by the tip 10a. Then, for example, when a refractive index difference $\Delta$ between the core 2 and the under cladding layer 1/the over cladding layer 3 is specified by use of a ratio A (=R/T) of a curvature radius R (unit: μm) of the tip 10a such as the pen tip to a thickness T (unit: μm) of the core 2, the maximum value $\Delta$max of the refractive index difference $\Delta$ is as in Formula (1) below. That is, when the refractive index difference $\Delta$ is larger than this maximum value $\Delta$max, even when pressing is performed by the tip 10a such as the pen tip, the amount of leakage (scattering) of light is small and the light detection level in the light receiving element 5 does not sufficiently decrease, thereby making it difficult to distinguish between the position of the tip 10a such as the pen tip and the position of the hand 20.

(Mathematical Formula 1)

$$\Delta max = 8.0 \times 10^{-2} - A \times (5.0 \times 10^{-4}) \quad (1)$$

On the other hand, the minimum value $\Delta$min of the refractive index difference $\Delta$ is as in Formula (2) below. That is, when the refractive index difference $\Delta$ is smaller than this minimum value $\Delta$min, leakage (scattering) of light occurs even at the portion pressed by the hand 20, thereby making it difficult to distinguish between the position of the tip 10a such as the pen tip and the position of the hand 20.

(Mathematical Formula 2)

$$\Delta min = 1.1 \times 10^{-2} - A \times (1.0 \times 10^{-4}) \quad (2)$$

For this reason, the refractive index difference $\Delta$ is preferably set to between the minimum value $\Delta$min and the maximum value $\Delta$max. Here, for example when it is assumed that the curvature radius R (unit: μm) of the tip 10a is within a range of 100 to 1000, the thickness T (unit: μm) of the core 2 is within a range of 10 to 100 and the ratio A is within a range of 1 to 100, the refractive index difference $\Delta$ is within a range of $1.0 \times 10^{-3}$ to $7.95 \times 10^{-2}$. It is to be noted that in the case of the ratio A exceeding 100, the minimum value $\Delta$min is set to $1.0 \times 10^{-3}$ (fixed).

It is to be noted that, although information has been transmitted from the electronic underlay A to the personal computer P through the connection cable C in the above embodiment, it may be wirelessly transmitted. In that case, since power required for the electronic underlay A is not supplied from the personal computer P via the connection cable C, a power source such as a battery is provided in the electronic underlay A.

Further, although the rigid plate 7 has been provided for supporting the optical waveguide W in the above embodiment, the rigid plate 7 may not be provided. In that case, input is made in a state where the optical waveguide W of the electronic underlay A is placed on a hard flat-surface stand such as a table.

Next, an example will be described in conjunction with a comparative example. However, the present invention is not restricted to the example.

EXAMPLE

[Formation Material for Over Cladding Layer]
Component A: epoxy resin (EPOGOSEY PT., manufactured by Yokkaichi Chemical Company Ltd.) 30 parts by weight
Component B: epoxy resin (EHPE3150, manufactured by Daicel Corporation) 70 parts by weight
Component C: photoacid generator (CPI200K, manufactured by San-Apro Ltd.) 4 parts by weight
Component D: ethyl lactate (manufactured by Wako Pure Chemical Industries, Ltd.) 100 parts by weight
By mixing these components A to D, a formation material for the over cladding layer was prepared.

[Formation Material for Core]
Component E: epoxy resin (EHPE3150, manufactured by Daicel Corporation) 80 parts by weight
Component F: epoxy resin (YDCN700-10, manufactured by NIPPON STEEL & SUMIKIN CHEMICAL CO., LTD.) 20 parts by weight
Component G: photoacid generator (SP170, manufactured by ADEKA CORPORATION) 1 part by weight
Component H: ethyl lactate (Wako Pure Chemical Industries, Ltd.) 50 parts by weight
By mixing these components E to H, a formation material for the core was prepared.

[Formation Material for Under Cladding Layer]
Component I: epoxy resin (EPOGOSEY PT., manufactured by Yokkaichi Chemical Company Ltd.) 75 parts by weight
Component J: epoxy resin (JER1007, manufactured by Mitsubishi Chemical Corporation) 25 parts by weight
Component K: photoacid generator (CPI200K, manufactured by San-Apro Ltd.) 4 parts by weight
Component L: ethyl lactate (Wako Pure Chemical Industries, Ltd.) 50 parts by weight
By mixing these components I to L, a formation material for the under cladding layer was prepared.

[Production of Optical Waveguide]
Using the above formation material for the over cladding layer, an over cladding layer was formed on the surface of a glass substrate by spin coating. This over cladding layer had a thickness of 5 μm, an elasticity modulus of 1.2 GPa and a refractive index of 1.503.

Subsequently, using the above formation material for the core, a core was formed on the surface of the over cladding layer by a photolithography method. This core had a thickness of 30 μm, a width of its lattice-like portion of 100 μm, a pitch of 600 μm, an elasticity modulus of 3 GPa and a refractive index of 1.523.

Next, using the above formation material for the under cladding layer, an under cladding layer was formed on the surface of the over cladding layer by spin coating so as to cover the core. This under cladding layer had a thickness (thickness from the surface of the over cladding layer) of 200 μm, an elasticity modulus of 3 MPa and a refractive index of 1.503.

Then, there was prepared one obtained by adhering a double sided tape (thickness: 25 μm) to one surface of a PET substrate (thickness: 1 mm). Subsequently, the other adhesive surface of the double sided tape was made to adhere to the surface of the under cladding layer, and in that state, the over cladding layer was separated from the glass substrate.

Comparative Example

[Formation Material for Over Cladding Layer]
Component M: epoxy resin (EPOGOSEY PT., manufactured by Yokkaichi Chemical Company Ltd.) 40 parts by weight
Component N: epoxy resin (2021P, manufactured by Daicel Corporation) 60 parts by weight
Component O: photoacid generator (SP170, manufactured by ADEKA CORPORATION) 4 parts by weight
By mixing these components M to O, a formation material for the over cladding layer was prepared.

[Formation Material for Core]
Component P: epoxy resin (EPOGOSEY PT., manufactured by Yokkaichi Chemical Company Ltd.) 30 parts by weight
Component Q: epoxy resin (EXA-4816, manufactured by DIC Corporation) 70 parts by weight
Component R: photoacid generator (SP170, manufactured by ADEKA CORPORATION) 4 parts by weight
By mixing these components P to R, a formation material for the core was prepared.

[Formation Material for Under Cladding Layer]
Component S: epoxy resin (EPOGOSEY PT., manufactured by Yokkaichi Chemical Company Ltd.) 40 parts by weight
Component T: epoxy resin (2021P, manufactured by Daicel Corporation) 60 parts by weight
Component U: photoacid generator (SP170, manufactured by ADEKA CORPORATION) 4 parts by weight
By mixing these components S to U, a formation material for the under cladding layer was prepared.

[Production of Optical Waveguide]
In the same manner as in the above example, an optical waveguide having the same size was prepared. However, an elasticity modulus of the over cladding layer was 1 GPa, that of the core was 25 MPa, and that of the under cladding layer was 1 GPa. Further, a refractive index of the over cladding layer was 1.504, that of the core was 1.532, and that of the under cladding layer was 1.504.

[Production of Electronic Underlay]
A light emitting element (XH85-S0603-2s, manufactured by Optowell Co., Ltd.) was connected to one end surface of the core in the optical waveguide of each of the above example and the comparative example. A light receiving element (s10226, manufactured by Hamamatsu Photonics K.K.) was connected to the other end surface of the core. A circuit, mounted with the light emitting element, the light receiving element, a CPU for controlling the electronic underlay, and the like, was provided to produce the electronic underlay of each of the example and the comparative example.

[Production of Information Management System]
A personal computer with a display was prepared, and connected with the electronic underlay through a connection cable, to produce an information management system. The personal computer is incorporated with software (program) for converting coordinates in an inputted region of the electronic underlay to coordinates in a screen of the display and displaying, on the display, letters or like inputted on the electronic underlay.

[Confirmation of Information Management System]
A sheet was put on the surface of the over cladding layer in the optical waveguide of the electronic underlay, and a data inputting person held a ballpoint pen (curvature radius of a pen tip: 350 μm) in his or her hand and entered letters on the sheet.

As a result, in the information management system using the electronic underlay of the example, only the letters entered in the sheet were displayed on the display and also stored into the memory of the personal computer. As opposed to this, in the information management system using the electronic underlay of the comparative example, not only the letters entered in the sheet but also a portion of the hand holding the ballpoint pen was displayed on the display and also stored into the memory of the personal computer.

From this result, it is found that only information written on the sheet can be detected and unnecessary information cannot be detected in the information management system using the electronic underlay of the example.

Although the specific form in the present invention has been shown in the above example, the above example is mere exemplification, and should not be restrictively interpreted. A variety of modifications apparent to the skilled person in the art are intended to be within the scope of the present invention.

The information management system of the present invention is usable for writing information such as letters on a sheet and simultaneously forming the information such as the letters into electronic data for management.

EXPLANATION OF REFERENCES

A electronic underlay
D display
P personal computer
K sheet
W optical waveguide
2 core
10 writing tool

The invention claimed is:
1. An information management system, comprising:
a personal computer having a display; and
an electronic underlay which capable of being laid under a sheet to perform writing with a writing tool,
wherein the electronic underlay specifies a movement locus of a tip of the writing tool on a surface of the sheet, outputs the movement locus to the personal computer, and displays the movement locus on the display,
wherein the electronic underlay comprises:
 a sheet-like optical waveguide in which a plurality of linear cores are arranged and formed in a lattice shape on the surface of a sheet-like under cladding layer, an over cladding layer is formed in a sheet shape covering plurality of linear the cores, and the surface of the over cladding layer is a contact surface with the sheet;
 a light emitting element connected to a first end surface of the plurality of linear cores;
 a light receiving element connected to a second end surface of the plurality of linear cores; and
 movement locus specifying means for specifying a movement locus of a tip of a writing tool on a surface of the optical waveguide based on a light propagation amount of the plurality of linear cores, the light propagation amount being changed due to the movement, wherein an elasticity modulus of the plurality of linear cores is larger than an elasticity modulus of the under cladding layer and an elasticity modulus of the over cladding layer, and wherein, in a state where the surface of the sheet-like optical waveguide is pressed by the tip of the writing tool, in a direction of the pressing, a deformation ratio of the plurality of linear cores in a cross section is smaller than deformation ratios of the over cladding layer and the under cladding layer in cross sections.

2. The information management system according to claim 1, wherein the elasticity modulus of the plurality of linear cores is within a range of 1 GPa to 10 GPa.

3. The information management system according to claim 1, wherein the elasticity modulus of the over cladding layer is within a range of not lower than 0.1 MPa and lower than 10 GPa, and the elasticity modulus of the under cladding layer is within a range of 0.1 MPa to 1 GPa.

4. The information management system according to claim 2, wherein the elasticity modulus of the over cladding layer is within a range of not lower than 0.1 MPa and lower than 10 GPa, and the elasticity modulus of the under cladding layer is within a range of 0.1 MPa to 1 GPa.

* * * * *